US005713591A

United States Patent [19]

Zarkhin et al.

[11] Patent Number: 5,713,591

[45] Date of Patent: Feb. 3, 1998

[54] MULTIPOSITION LEG AND FOOT, ARM AND HAND SUPPORTS FOR WHEELCHAIRS

[76] Inventors: Gregory Zarkhin, 6601 Maplewood Dr., #301, Mayfield Heights, Ohio 44124; Steve A. Fine, 3440 Avalon Rd.-#401, Shaker Heights, Ohio 44120

[21] Appl. No.: 537,090

[22] Filed: Sep. 29, 1995

[51] Int. Cl.$^{6}$ .......... B62K 15/00

[52] U.S. Cl. .......... 280/250.1; 280/304.1; 280/291; 248/118.3; 297/423.19; 297/DIG. 4

[58] Field of Search .......... 280/250.1, 304.1, 280/291; 248/118, 118.1, 118.3, 118.5; 297/423.1, 423.17, 423.18, 423.19, 423.25, DIG. 4

[56] References Cited

U.S. PATENT DOCUMENTS

| | | | |
|---|---|---|---|
| 3,124,328 | 3/1964 | Kortsch | 248/118 |
| 3,863,984 | 2/1975 | Sickels | 297/423.17 |
| 4,069,995 | 1/1978 | Miller | 248/118.1 |
| 4,617,919 | 10/1986 | Suhre | 280/250.1 |
| 4,712,836 | 12/1987 | Gerber | 297/423.19 X |
| 4,981,305 | 1/1991 | Lockard et al. | 297/423.25 X |
| 5,217,239 | 6/1993 | Koet | 280/250.1 X |
| 5,242,138 | 9/1993 | Kornberg | 248/118 |
| 5,281,001 | 1/1994 | Bergsten et al. | 248/118 X |
| 5,326,154 | 7/1994 | Williamson et al. | 297/DIG. 4 |
| 5,393,082 | 2/1995 | Fenley | 280/304.1 X |
| 5,401,045 | 3/1995 | Foerster et al. | 280/250.1 |
| 5,522,644 | 6/1996 | Peek | 297/423.35 X |

*Primary Examiner*—Kevin Hurley

*Attorney, Agent, or Firm*—Joseph H. Taddeo

[57] ABSTRACT

Multipositioning components for a wheelchair including hand, arm and elbow plates and leg, foot and heel components which are form fitted to a patient. And as components of repositionable hand, arm and elbow subassemblies the plates can be extended and aligned for a particular patient or removed and then replaced without disturbing the prior adjustment and alignment of the subassembly.

23 Claims, 3 Drawing Sheets

MULTIPOSITION LEG AND FOOT, ARM AND HAND SUPPORTS FOR WHEELCHAIRS

FIELD OF INVENTION

The present invention relates to vehicles that are intended to be propelled by the hands of a seated occupant and more particularly, to wheelchairs which have adjustable multiposition supports and that are specifically designed for improved comfort for the occupant. These multiposition supports are attachments which are adjustable and positionable to conform to the natural at-rest position of the hands and arm, as well as the foot and legs.

BACKGROUND OF THE INVENTION

For the most part, wheelchairs are designed to transport patients from one location to another. Patients who are immobilized with fractures, loss of balance, or muscular or skeletal problems may need to be transported to a doctor's office or perhaps to a rehabilitation facility for treatment. These presently designed wheelchairs fulfill the need of the patient who uses the wheelchair on a temporary basis during convalescence.

Typically, these presently designed wheelchairs may have armrests upon which the patient can rest his forearm. Footrests are usually provided upon which the patient can rest his feet while being transported. These footrests are not designed to keep the foot or leg in place but are primarily designed to support one's foot and leg to protect them from injury by dragging them during transit. A patient who may be disabled by a stroke would have difficulty in positioning his arms or legs, or even his hands and feet so they would not fall off these arms and footrests. The use of various slings and garments is frequently found in nursing homes and in hospitals to support those who are physically impaired.

There is an increased need for providing for the physical comfort for those who have long term disabilities. These patients frequently spend many long hours in wheelchairs that are not designed to accommodate for the comfort of the occupant when sitting for long periods of time. Those who are confined to a wheelchair for extended periods of time could develop abrasions and sores when their limbs repeatedly slip off the rests.

A special need also exists for the quick removal of the limb supports that will not disturb and move the component subassemblies which were previously aligned and adjusted.

There have been a number of disclosures for wheelchair attachments that have been patented. For the most part, these patents are for complicated structures that do not address the design of apparatus that is specifically created to provide for the comfort of a patient who has a long-term physical disability.

There are several patents that disclose attachments for wheelchairs.

U.S. Pat. No. 4,989,890, granted Feb. 5, 1991, to Lockard et al. discloses an adjustable folding child's wheelchair that expands easily to accommodate a child with growth.

U.S. Pat. No. 4,632,451, granted Dec. 30, 1986, to H. D. Lee, discloses an arm rest structure that is adapted to a wheelchair that supports a table or desk attachment.

U.S. Pat. No. 4,730,869, granted Mar. 15, 1988, to L. L. Schumacher discloses a wheelchair armrest storage compartment for storing personal articles of the wheelchair occupant, as well as identification and money.

U.S. Pat. No. 5,393,082, granted Feb. 28, 1995, to J. M. Fenley, teaches a new and improved adjustable-tilt footrest. Fenley does not provide for the comfortable positioning of the leg and calf; he only addresses the newly designed footrest.

Therefore, it can be concluded that there exists a continuing need for the development of attachments to wheelchairs which will provide more comfort to those confined to one. In this regard, the subject invention fulfills this need.

SUMMARY OF THE INVENTION

The present invention in its preferred embodiment pertains to equipment for attachment to a wheelchair and adaption of a wheelchair to have repositionable and formable armrest and handrest components, as well as legrest and footrest members. As such, a wheelchair using these design principles would easily be adapted for use with patients who have hand, arm, leg or foot contractures, such as patients having muscular sclerosis or muscular dystrophy.

In general, wheelchairs are designed to transport patients from place to place, but the fact remains that patients frequently spend long hours sitting in a wheelchair. And these wheelchairs were not designed or accommodating for comfort when sitting for long periods of time.

As such, the multiposition supports and wheelchair components disclosed herein are designed to equip the wheelchair with an armrest support essentially formed to a paralytic arm, elbow and hand; or similarly, the patient's leg, heel and foot.

Extendible or telescoping armatures are readily adjustable to form fit, in lengthwise dimensions, to the curvature of the patient's arms and legs.

It is therefore an object of this invention to provide for formable and repositionable armrests and handrests as attachments for specialized use with wheelchairs.

It is another object of this invention to provide for formable and repositionable legrests and footrests as attachments for specialized use with wheelchairs.

It is still another object of this invention to provide for formable and repositionable armrests and handrests, as attachments for specialized use with wheelchairs, that will provide more comfort to the limbs being supported by these newly designed form fitting attachments.

It is yet another object of this invention to provide for formable and repositionable legrests and footrests, as attachments for specialized use with wheelchairs, that will provide more comfort to the limbs being supported by these newly designed form fitting attachments.

One other object of the invention is to provide for the removal of partial subassemblies without disturbing the pre-adjustments and the previous alignments. The use of slide connectors provide this convenience.

Lastly, it is another object of this invention to provide a cost effective design that will not substantially increase the costs to those who find use for these attachments.

Further advantages will be apparent to those of ordinary skill in the art upon reading and understanding the following detailed description.

DETAILED DESCRIPTION OF THE PREFERRED EMBODIMENT

Figure 1:
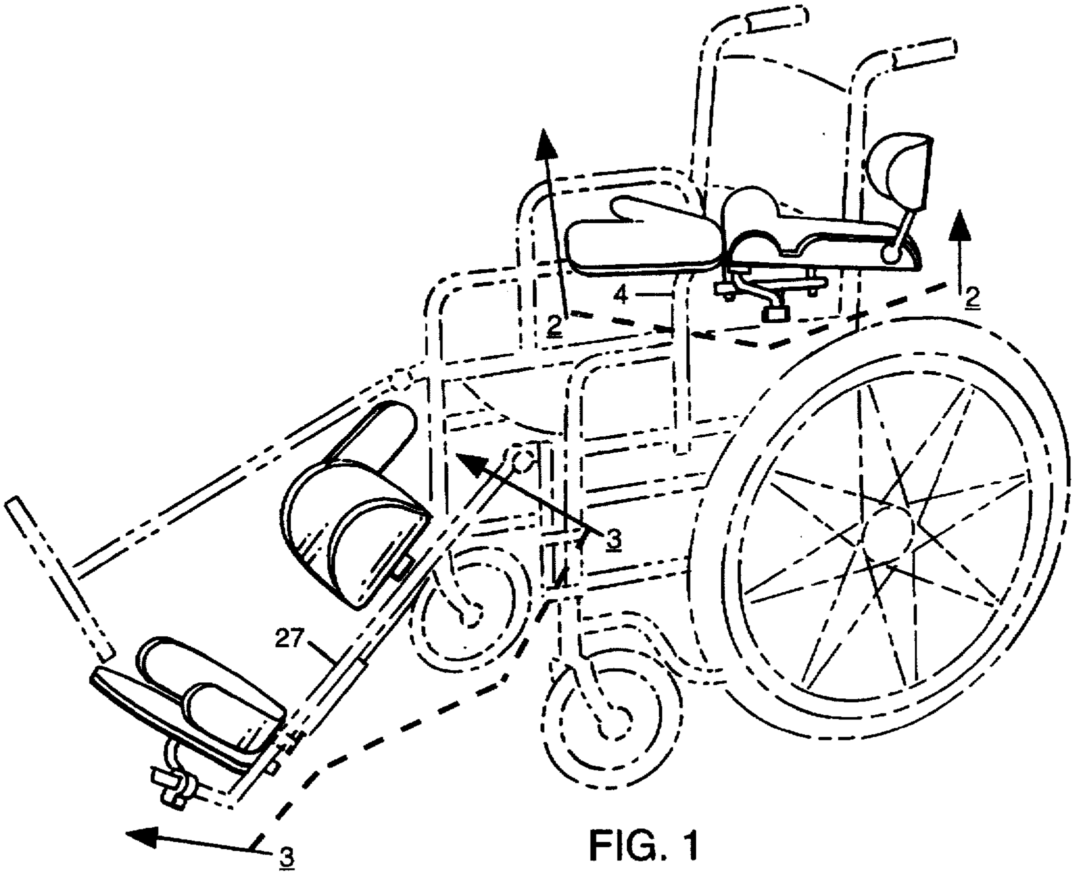
FIG. 1 shows a wheelchair with connector elements that include wheelchair arm rail and lower tubular extension of the wheelchair, for interconnections between the wheelchair and the two extremity support systems.

With reference to the drawings, and in particular to FIG. 1, the preferred embodiment of the newly designed and improved armrests and handrests for wheelchairs, utilizing the principles and concepts of the present invention, is to provide for the improved comfort for those confined to a wheelchair.

Specifically, the new and improved armrests and handrests for use with wheelchairs are comprised of a plurality of essential components to provide the maximum of comfort for those who may be physically disadvantaged with a paralytic hand or arm. To meet the desired objective of providing the maximum of comfort to the occupant, the individual components are specifically correlated with one another to achieve this goal.

Figure 2:
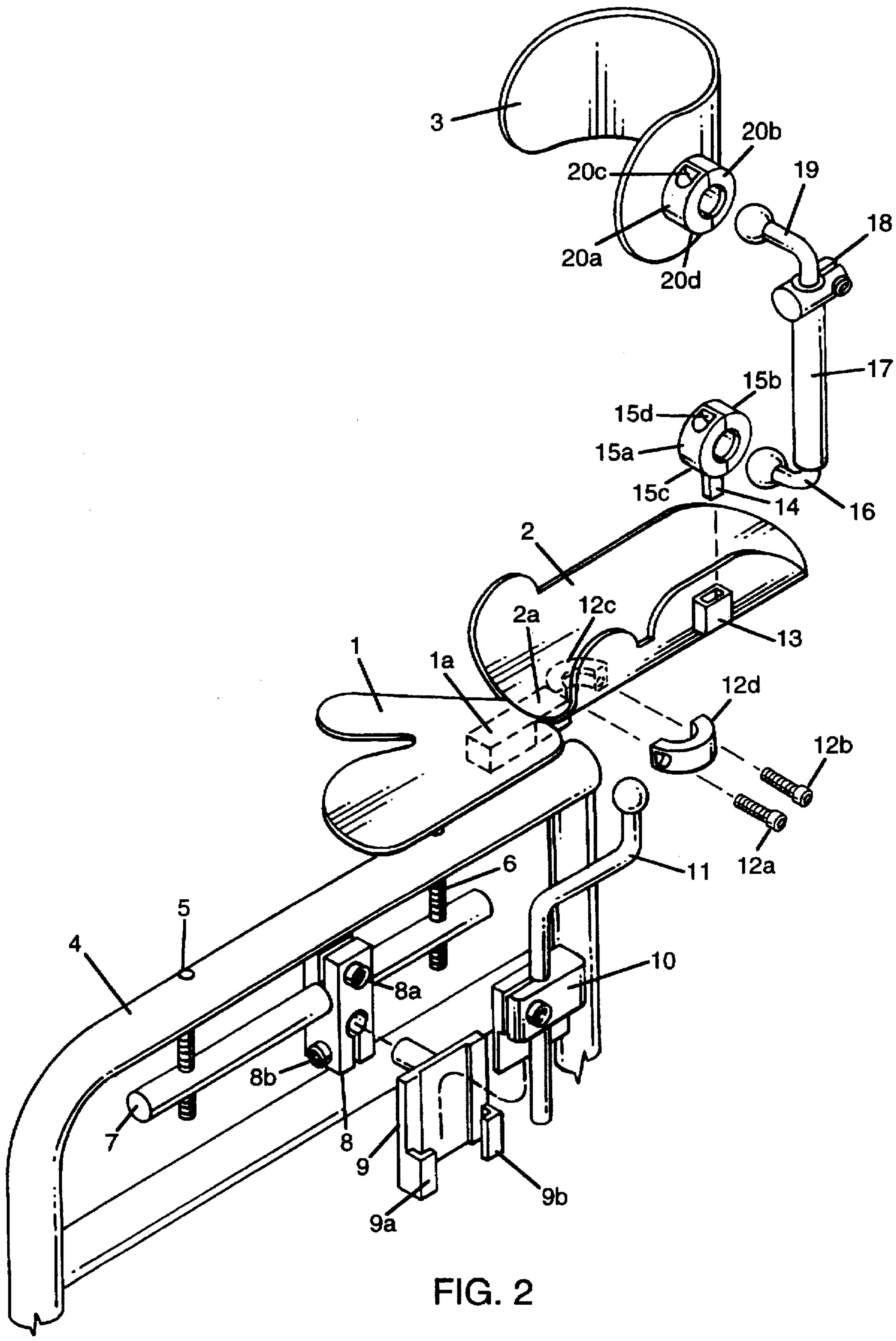
FIG. 2 is a detailed exploded view of the left-hand armrest assembly of the wheelchair. Shown immediately connected to the handplate is the forearm trough; located further above the forearm trough is the elbow stop.

Shown in FIG. 2 is a detailed exploded view of the left side of the handrest and armrest assemblies.

In typical use, the left hand of the wheelchair occupant rests comfortably upon handplate 1 where the forearm is comfortably supported within the form fitting forearm trough 2. The elbow is carefully brought to rest against the form fitting elbow stop 3.

Mounted in the left wheelchair arm rail 4 are two bolts 5 and 6 made of running thread to provide vertical adjustment of adjustable mounting rod 7. A first link consisting of a female mounting adapter 8 mounts on adjustable mounting rod 7 where it is free to be positioned between running thread bolts 5 and 6. In addition, the female mounting adapter 8 can be positioned so that it can pivotally rotate radially about the central axis of adjustable mounting rod 7. When the mounting adapter 8 is in the desired position, it can be fixed in place by tightening the upper split clamp by cap-screw **8*a***.

The female slide mounting adaptor 9 inserts directly into the lower transverse mounting hole, which is orthogonal to the upper hole, of mounting adaptor 8. Slide mounting adaptor 9 is free to rotate and when it is in the desired position, it can be fixed in place by tightening the lower split clamp by cap-screw **8*b*. The male mounting slide 10 is then inserted into the slide mounting adaptor 9 where it bottoms out at fixed stops 9*a* and 9*b*. It also serves to function as a clamp to hold the forearm-support ball rod 11** in a fixed position.

The forearm ball clamp, comprised of **12*c* and 12*d*, maintains the relative positioning of the forearm-trough assembly 2 in the desired position by the frictional force that is applied when cap screws 12*a* and 12*b* are properly tightened. Forearm ball clamp 12*c* is permanently attached to the bottom of the forearm-trough 2**.

All ball clamps with their associated ball rods form swivel joints where the ball rod can be positioned in an area bounded by a cone approximating 15 degrees. The frictional force that is applied as each cap-screw is tightened, maintains the relative position of the ball rod.

Attached beneath handplate 1 is a square shaped rod **1*a*, having the dimensions of 0.5×0.5×4.5 inches, which inserts into a rectangular receptacle 2*a* that is welded to the under portion of the forearm trough 2. Also located on the side of the forearm trough 2 is the female forearm slide connector 13 for the elbow stop assembly. A male slide connector 14 which has one-half of the ball clamp 15*a* welded to it comprise the lower portion of the removable elbow stop assembly. The free end of ball clamp 15*b* is secured by cap screws 15*c* and 15*d***.

The lower elbow stop ball rod 16 inserts into ball clamp 15 where it remains stationary by the frictional force which is applied by tightening cap-screws **15*c* and 15*d*. The opposite end inserts into telescoping tube 17 which provides a height adjustment for the elbow stop 3. The upper elbow stop ball rod 19 is secured in telescoping tube 17 via the ball rod telescoping clamp 18**.

The formed elbow stop 3 has one-half of ball clamp **20*a* welded to it. The free end of elbow stop ball clamp 20*b* is secured by cap-screws 20*c* and 20*d*. The upper elbow stop ball rod 19 inserts into ball clamp 20 where it remains stationary by the frictional force which is applied by tightening cap-screws 20*c* and 20*d***.

As shown in FIG. 2, the first removable subassembly is the elbow stop subassembly. This subassembly is comprised of male slide connector ball clamp 15, lower elbow stop ball rod 16, telescoping tube 17, ball rod telescoping clamp 18, upper elbow stop ball rod 19, and elbow stop ball clamp 20. The quick removal and reinsertion is provided by inserting the male slide connector 14 into the female forearm slide connector 13.

The same provision for the quick release and reinsertion of the hand and arm support subassembly is provided by inserting the male mounting slide connector 10 into the female slide mounting adaptor 9.

Figure 3:
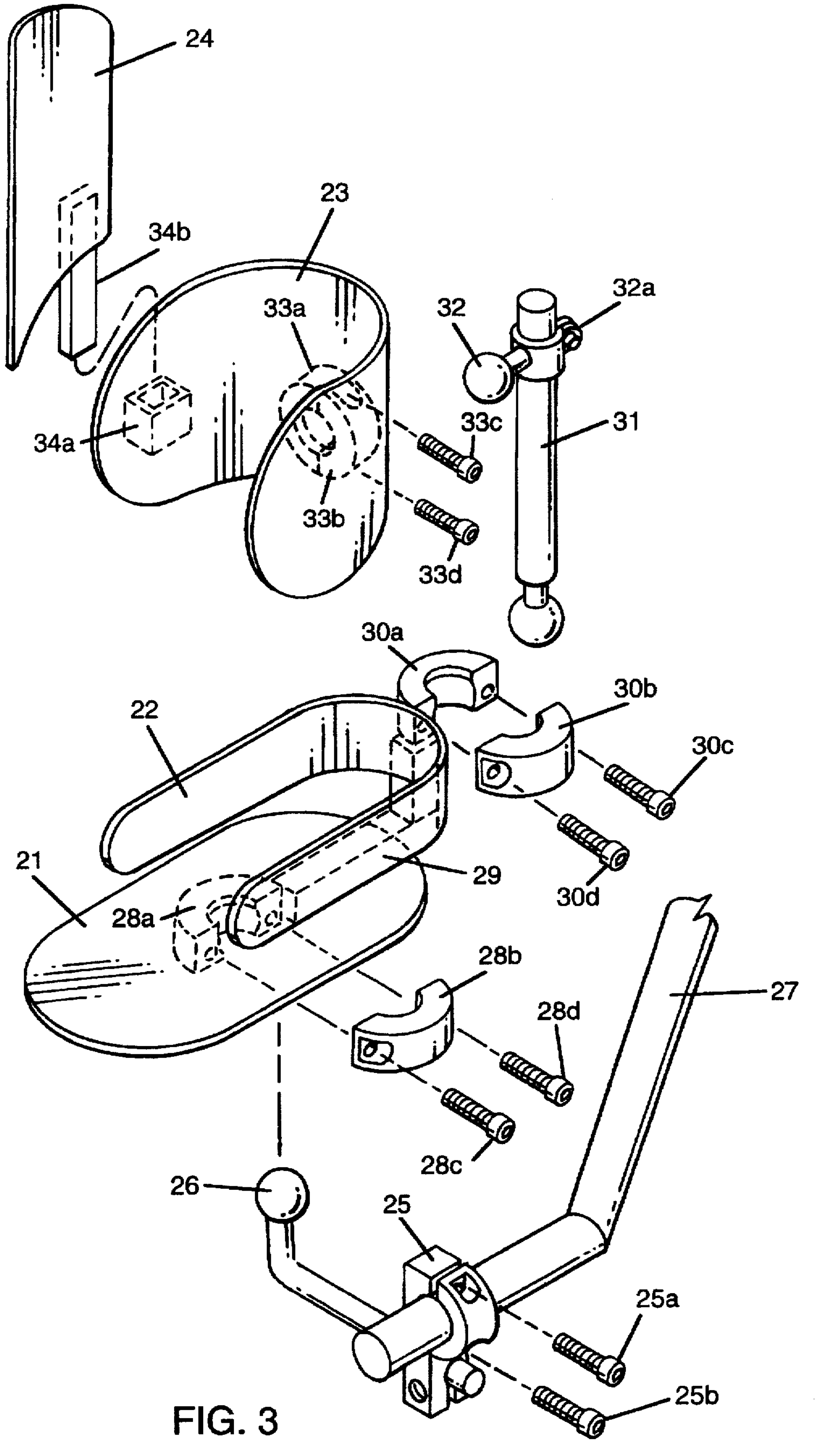
FIG. 3 is a detailed exploded view of the left-side legrest assembly of the wheelchair. Shown immediately above the footplate is the heel stop; located further above the heel stop is the calfplate.

Turning now to FIG. 3, is a detailed exploded view of the right side of the footrest and leg support assemblies.

Typically, the foot of the wheelchair occupant rests comfortably upon footplate 21 where the heel is comfortably positioned into the form fitting heel stop yoke 22. The calf is then positioned into the form fitting contoured calf plate 23. The occupant's knee is carefully brought to rest against the knee plate ab-aductor 24.

Wheelchair mounting clamp 25 is designed to clamp the orthogonally mounted ball rod 26 to the lower tubular extension of the wheelchair 27. Cap-screws **25*a* and 25*b*** compress the mounting clamp to keep it securely in position.

Permanently fixed to the underneath, center of footplate 21 is one-half of footplate ball-clamp **28*a*. The remaining half of footplate ball-clamp 28*b* is bolted together with the fixed half of 28*a*, with cap-screws 28*c* and 28*d*, about the ball end of ball rod 26**.

Also permanently affixed to the underneath, from the center of footplate 21 is "L" shaped bar connector 29. This bar serves as a connector from the footplate to the heel-stop assembly. It has a square cross-section of 0.75×0.75 inches; and dimensioned at 6.00 inches long along the horizontal axis and 2.75 inches along the vertical rise.

Welded to the top of the "L" shaped bar 29 is one-half of heel stop ball-clamp **30*a*. The free half of ball-clamp 30*b* is bolted with cap-screws 30*c* and 30*d*. Form fitting heel stop yoke 22 is permanently mounted to the vertical rise of the "L" shaped bar 29 and to one-half of the heel stop ball-clamp 30*a***.

Held in place by the split ball clamp 30 is the vertically positioned contoured calf plate support bar 31. This bar consists of an 8.00 inch long, 0.875 diameter steel-tube, that has a steel rod with a steel ball on one end pressed into the lower portion of support bar 31.

Adjuster clamp 32 if free to move up and down, as well as radially, along support bar 31. Clamping action takes place by tightening cap-screw 32*a*. The opposite unclamped end of adjuster clamp 32 has a ball end which engages into the calf-plate ball-clamp 33.

One-half of the ball clamp 33*a* is permanently attached to the rear of the form fitting calfplate 23. The free half of the ball clamp 33*b* is clamped over the ball rod end 32 to form a multipostional swivel. Cap-screws 33*c* and 33*d* assert the frictional force applied to this swivel joint.

The metal rectangular slide 34*b* is welded to the lower portion of knee-plate ab-aductor 24. This slide permits for the easy removal and reinsertion of the knee-plate ab-aductor, thereby obviating the need for readjustment. The slide engages into the female rectangular receptacle 34*a* that is welded to the side of the form fitting calf plate 23.

Figure 4:
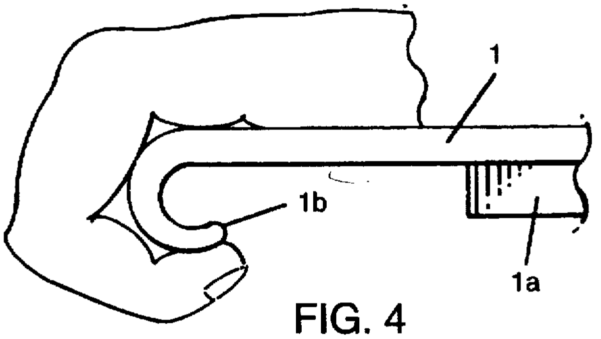
FIG. 4 is a side view of the hand plate end portion shaped for conforming the plate to a palsied hand.
Figure 5:
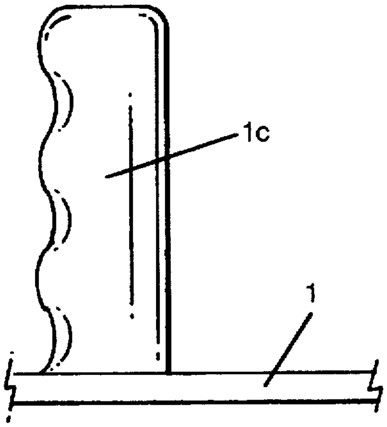
FIG. 5 is a side view a hand plate equipped with a grip handle for tactile grasp by the patient.

FIG. 4 shows how the hand plate 1 with end portion 1*b* may preferably be shaped for conforming the plate to a palsied hand. In an alternate embodiment for the hand plate shown in FIG. 5, a grip handle 1*c* may be fixed to the hand plate 1 for tactile grasp by the patient. The handle bar or grip handle 1*c* provides some control and an added sense of balance for the wheelchair patient.

The details described are with reference to the preferred embodiment. Obviously, modifications of this invention can occur to others skilled in the art upon reading this specification. It is not the intent to limit the invention to the exact construction details shown, but to include any modifications or alterations that fall within the scope of the appended claims or their equivalents.

I claim:

1. A specialized wheelchair for use by a patient with debilitating conditions of both the upper and lower extremities, and for simultaneous support of said upper and lower extremities, the wheelchair having an arm rail and a lower extension, comprising:

a formable and repositionable armrest assembly that includes a forearm subassembly having a trough piece, an elbow stop subassembly and a handplate subassembly, the armrest assembly mounted on the arm rail and the forearm subassembly adapted for formation to and alignment with a patient's arm, forearm and hand;

a formable and repositionable legrest assembly that includes a footplate subassembly with a footplate piece, a knee ab-aductor, a calf plate, and a heel stop yoke, the legrest assembly mounted on the lower extension and the footplate subassembly adapted for formation to and alignment with a patient's knee, calf, foot and heel;

slide connector means associated with the armrest assembly for slidably removing the forearm subassembly, while maintaining formation to and alignment with a patient's arm, forearm and hand; and, mounting means for removably securing the legrest assembly to the lower extension to slidably remove the footplate subassembly while maintaining formation to and alignment with a patient's knee, calf, foot and heel.

2. The specialized wheelchair according to claim 1, wherein the handplate subassembly comprises a handplate piece with an end portion for supporting a hand, the handplate subassembly repositionable on, and removably connected to, the forearm subassembly;

means for vertical adjustment for adjusting the handplate and forearm subassemblies for raising, lowering and leveling the patient's upper extremity.

3. The specialized wheelchair according to claim 2, wherein said means for vertical adjustment comprises an adjustable mounting rod with a central axis and a transverse axis, the mounting rod further having a pair of threaded holes, the wheelchair arm rail having a pair of threaded holes corresponding to the threaded holes of the mounting rod, and a pair of threaded bolts mounted in the wheelchair arm rail and in the adjustable mounting rod, for vertical adjustment and leveling of the rod on the arm rail;

the armrest assembly further comprising a means for pivotal rotation of the handplate and forearm subassemblies radially about the central axis of the adjustable mounting rod; and, grip means associated with the handplate piece end portion, for tactile grasp, control, and balance by a wheelchair patient having a grip strength.

4. The specialized wheelchair according to claim 3, wherein the means for pivotal rotation of the handplate and forearm subassemblies comprises a first link having a female mounting adapter with an upper mounting hole and a lower mounting hole therethrough, the lower hole grooved essentially orthogonal to the upper hole, and each mounting hole having an adjacent capscrew to form an upper and a lower split clamp; the mounting rod inserted in the upper split clamp to mount the first link on the adjustable mounting rod, and positioned between the bolts, for pivotal rotation of said first link radially about the central axis of the adjustable mounting rod to a desired position and fixed in the desired position by tightening the capscrew of the upper split clamp.

5. The specialized wheelchair according to claim 4, the elbow stop subassembly having an elbow stop piece, the elbow stop subassembly repositionable on, and removably connected to, the forearm subassembly;

a means for alignment and adjustment of said elbow stop piece in relation to the forearm piece; and, a second link repositionally attached to the first link, the second link having a means for radial rotation on the transverse axis of said adjustable mounting rod.

6. The specialized wheelchair according to claim 5, wherein the means for radial rotation of the second link on the transverse axis of the adjustable mounting rod comprises a female slide mounting adaptor having interior and exterior sides, a rod projection mounted on the interior side for insertion in, and securement by, the lower slit clamp and its adjacent cap screw; and a means for three dimensional repositioning of said forearm, handplate and elbow stop subassemblies.

7. The specialized wheelchair according to claim 6, wherein the slide connector means for slidably removing the forearm subassembly, while maintaining formation to and alignment with a patient's arm, forearm and hand, comprises the female slide mounting adaptor further having a pair of stop guides mounted on its exterior side;

a male mounting slide having a slit therethrough, the slit having an adjacent capscrew to form a slit clamp, the male mounting slide insertable in, and slidably removable from, the female slide mounting adaptor.

8. The specialized wheelchair according to claim 7, wherein the means for three dimensional repositioning of said forearm, handplate and elbow stop subassemblies comprises the forearm trough piece having upper and lower surfaces, with a forearm ball clamp secured on its lower surface, the forearm ball clamp having cap screws for tightening the clamp;

a forearm support ball rod swivel formed as an L-shaped rod with leg and foot portions in a plane, the foot portion having a further projection extending obliquely up from the plane of the L-shaped rod, and the projection culminating with a support ball integrally formed on the end of the rod; the leg portion insertable in and secured by the slit clamp of male mounting slide to provide a further discretionary positioning on a vertical elevation of the forearm trough and tightening the cap screw of the male mounting slide to secure the rod in the slit clamp at a desired elevation; and the ball at the end of said oblique projection insertable in and secured by the forearm ball clamp by tightening the cap screws of the forearm ball clamp after the forearm trough is brought to a desired position by a three-dimensional rotation of the trough on said support ball.

9. The specialized wheelchair according to claim 8, wherein the means for alignment and adjustment of said elbow stop piece comprises a female forearm slide connector permanently attached to said lower surface of the forearm trough piece;

a male slide connector formed as two open cylinder halves with a cylinder cavity formed therein, and cap screws to tighten the cylinder around the cavity to form a ball clamp; and the cylinder further having a projector connection fixed to one of the cylinder halves, the projector connection insertable into the female forearm slide connector;

the elbow stop piece having inner and outer surfaces with a ball clamp fixed to its outer surface; and, an extendable ball rod swivel having a middle tube portion and two extension end portions, the end portions being L-shaped with a leg and a foot component, each end portion having its leg component inserted in the middle tube and the foot component of each end portion extending essentially orthogonally from the middle tube portion, and each end portion having a support ball integrally formed on the end of its foot component; the middle tube having a clamp for securing the end portions within the middle tube at a desired extension of the ball rod swivel; the ball of one end portion insertable in the ball clamp of the elbow stop piece, and the ball of the other end portion insertable in the cylinder cavity of the male slide connector; said means for alignment and adjustment enabling vertical adjustment and rotational alignment of the elbow stop piece on the forearm trough.

10. The specialized wheelchair according to claim 9, the mounting means for removably securing the legrest assembly comprising a wheelchair mounting clamp adapted for securing to the lower extension of a wheelchair, and, an ball rod with first and second ends, the first end mounted in said clamp for securing the ball rod securely in position within the clamp; and, the second end having a ball formed thereon.

11. The specialized wheelchair according to claim 10, the footplate piece having top and bottom surfaces; a ball clamp with first and second halves, the first ball clamp half fixed to the bottom footplate surface and the second half adapted to coact with, and be secured to, the first half by a pair of cap screws following insertion and positioning of the ball on the second ball rod end.

12. The specialized wheelchair according to claim 11, further comprising an L-shaped connector, with leg and foot portions, the leg portion also fixed to the bottom footplate piece surface, and the foot of the L-shape forming a vertical rise for securing on said foot the heel stop yoke and one-half of a heel stop ball clamp;

an opposed one-half of the heel stop ball clamp is adapted, in conjunction with a pair of cap screws, to secure within the heel stop ball clamp thus formed, a calf-plate support bar;

said support bar having a sliding and radially pivotal adjuster clamp, a ball end and tightening cap screw for clamping action when the clamp is directed in a desired position;

the calfplate having a contoured shape with interior and exterior sides, with a one-half ball clamp permanently attached on the exterior side, which together with a free second ball clamp half and a pair of cap screws is adapted to secure said ball end and, thereby secure the calf-plate support bar, the calf-plate and said footplate piece and heel stop yoke in the desired position.

13. The specialized wheelchair according to claim 12, wherein the contoured calf plate further comprises a female receptacle fixed to the exterior side thereof;

the knee plate ab-aductor having interior and exterior sides and a slide fixed on its exterior side for insertion in said female receptacle on the calf plate.

14. The specialized wheelchair according to claim 13, wherein said forearm trough piece, handplate piece, elbow stop piece, footplate, heel stop yoke, contoured calf plate and knee plate are constructed of formable light aluminum material.

15. The specialized wheelchair according to claim 13, wherein said forearm trough piece, handplate piece, elbow stop piece, footplate, heel stop yoke, contoured calf plate and knee plate are constructed of an elastic polymer material.

16. The specialized wheelchair according to claim 14, further comprising a covering layer on the aluminum pieces, the layer comprising a polymeric material.

17. The specialized wheelchair according to claim 13, wherein the grip means comprises the handplate piece end portion having a curved formation adapted for form fitting the hand of the patient.

18. The specialized wheelchair according to claim 13, wherein the grip means comprises a handle bar fixed to and rising upward from the handplate piece.

19. The specialized wheelchair according to claim 13, further comprising a means for repositionally connecting the handplate piece to the forearm trough piece.

20. The specialized wheelchair according to claim 19, wherein the means for repositionally connecting comprises the forearm trough having a rectangular receptacle fixed on the lower surface thereof, the handplate piece having a lower surface and a rod extension on the lower surface, the rod repositionally insertable and frictionally held within said receptacle.

21. A specialized wheelchair having an arm rail and a lower extension for attachment of multiposition supports to provide total positioning and support for a paralyzed patient's body and to sustain the upper and lower limbs of wheelchair patients, comprising:

an adjustable and conformable upper extremity support system for alignment to a patient's upper limb and conformation to a patient's arm, hand and elbow, said upper extremity support system mounted on the wheelchair arm rail;

an adjustable and conformable lower extremity support system for alignment to a patient's lower limb and conformation to a patient's leg, heel and foot, said lower extremity support system mounted to the lower extension of the wheelchair;

means for interchanging the upper and lower extremity support systems to alternate wheelchairs without changing the alignments and conformations previously obtained.

22. The specialized wheelchair according to claim 21, the upper extremity support system comprising:

a forearm subassembly with a forearm trough piece for supporting the upper extremity of a patient, the forearm subassembly repositionable on, and removably associated with, an arm rail of the wheelchair;

a handplate subassembly with a handplate piece for supporting a hand, the handplate subassembly repositionable on, and removably connected to, the forearm subassembly;

means for vertical adjustment for adjusting the handplate and forearm subassemblies for raising, lowering and leveling the patient's upper extremity, said means comprising an adjustable mounting rod with a central axis and a transverse axis, the mounting rod further having a pair of threaded holes, the wheelchair arm rail having a pair of threaded holes corresponding to the threaded holes of the mounting rod, and a pair of threaded bolts mounted in the wheelchair arm rail and in the adjustable mounting rod, for vertical adjustment and leveling of the rod on the arm rail; the support assembly further comprising a means for pivotal rotation of the handplate and forearm subassemblies radially about the central axis of the adjustable mounting rod;

wherein the means for pivotal rotation of the handplate and forearm subassemblies comprises a first link having a female mounting adapter with an upper mounting hole and a lower mounting hole therethrough, the lower hole grooved essentially orthogonal to the upper hole, and each mounting hole having an adjacent capscrew to form an upper and a lower split clamp; the mounting rod inserted in the upper split clamp to mount the first link on the adjustable mounting rod, and positioned between the bolts, for pivotal rotation of said first link radially about the central axis of the adjustable mounting rod to a desired position and fixed in the desired position by tightening the capscrew of the upper split clamp;

further comprising an elbow stop subassembly with an elbow stop piece, the elbow stop subassembly repositionable on, and removably connected to, the forearm subassembly;

a means for alignment and adjustment of said elbow stop piece in relation to the forearm piece;

a second link repositionally attached to the first link, the second link having a means for radial rotation on the transverse axis of said adjustable mounting rod, wherein the means for radial rotation of the second link on the transverse axis of the adjustable mounting rod comprises a female slide mounting adaptor having interior and exterior sides, a rod projection mounted on the interior side for insertion in, and securement by, the lower slit clamp and its adjacent cap screw;

the multiposition support assembly for a wheelchair further comprising a means for quick removal of the forearm, handplate and elbow stop subassemblies without disturbing an alignment and an adjustment of said subassemblies;

a means for three dimensional repositioning of said forearm, handplate and elbow stop subassemblies; wherein the means for quick removal of the forearm, handplate and elbow stop subassemblies without disturbing an alignment and adjustment of said subassemblies comprises the female slide mounting adaptor further having a pair of stop guides mounted on its exterior side;

a male mounting slide having a slit therethrough, the slit having an adjacent capscrew to form a slit clamp, the male mounting slide insertable in, and slidably removable from, the female slide mounting adaptor;

wherein the means for three dimensional repositioning of said forearm, handplate and elbow stop subassemblies comprises the forearm trough piece having upper and lower surfaces, with a forearm ball clamp secured on its lower surface, the forearm ball clamp having cap screws for tightening the clamp;

a forearm support ball rod swivel formed as an L-shaped rod with leg and foot portions in a plane, the foot portion having a further projection extending obliquely up from the plane of the L-shaped rod, and the projection culminating with a support ball integrally formed on the end of the rod; the leg portion insertable in and secured by the slit clamp of male mounting slide to provide a further discretionary positioning on a vertical elevation of the forearm trough and tightening the cap screw of the male mounting slide to secure the rod in the slit clamp at a desired elevation; and the ball at the end of said oblique projection insertable in and secured by the forearm ball clamp by tightening the cap screws of the forearm ball clamp after the forearm trough is brought to a desired position by a three-dimensional rotation of the trough on said support ball;

wherein the means for alignment and adjustment of said elbow stop piece comprises a female forearm slide connector permanently attached to said lower surface of the forearm trough piece;

a male slide connector formed as two open cylinder halves with a cylinder cavity formed therein, and cap screws to tighten the cylinder around the cavity to form a ball clamp; and the cylinder further having a projector connection fixed to one of the cylinder halves, the projector connection insertable into the female forearm slide connector;

the elbow stop piece having inner and outer surfaces with a ball clamp fixed to its outer surface;

an extendable ball rod swivel having a middle tube portion and two extension end portions, the end portions being L-shaped with a leg and a foot component, each end portion having its leg component inserted in the middle tube and the foot component of each end portion extending essentially orthogonally from the middle tube portion, and each end portion having a support ball integrally formed on the end of its foot component; the middle tube having a clamp for securing the end portions within the middle tube at a desired extension of the ball rod swivel; the ball of one end portion insertable in the ball clamp of the elbow stop piece, and the ball of the other end portion insertable in the cylinder cavity of the male slide connector; said means for alignment and adjustment enabling vertical adjustment and rotational alignment of the elbow stop piece on the forearm trough;

further comprising a wheelchair mounting clamp adapted for securing to the lower extension of a wheelchair;

an ball rod with first and second ends, the first end mounted in said clamp for securing the ball rod securely in position within the clamp; and, the second end having ball formed thereon;

further comprising a footplate subassembly with a footplate piece having top and bottom surfaces; a ball clamp with first and second halves, the first ball clamp half fixed to the bottom footplate piece surface and the second half adapted to coact with, and be secured to, the first half by a pair of cap screws following insertion and positioning of the ball on the second ball rod end;

further comprising an L-shaped connector, with leg and foot portions, the leg portion also fixed to the bottom footplate piece surface, and the foot of the L-shape forming a vertical rise for securing on said foot a heel stop yoke and one-half of a heel stop ball clamp;

an opposed one-half of the heel stop ball clamp is adapted, in conjunction with a pair of cap screws, to secure within the heel stop ball clamp thus formed, a calf-plate support bar;

said support bar having a sliding and radially pivotal adjuster clamp, a ball end and tightening cap screw for clamping action when the clamp is directed in a desired position;

a contoured calfplate with interior and exterior sides, with a one-half ball clamp permanently attached on the exterior side, which together with a free second ball clamp half and a pair of cap screws is adapted to secure said ball end and, thereby secure the calf-plate support bar, the calf-plate and said footplate piece and heel stop yoke in the desired position;

wherein the contoured calf plate further comprises a female receptacle fixed to the exterior side thereof;

a knee-plate ab-aductor with interior and exterior sides and a slide fixed on its exterior side for insertion in said female receptacle on the calf plate;

wherein said forearm trough piece, handplate piece, elbow stop piece, footplate, heel stop yoke, contoured calf plate and knee plate are constructed of formable light aluminum material;

further comprising a covering layer on the aluminum pieces, the layer comprising a polymeric material;

wherein the handplate piece further comprises an end portion;

means for gripping the handplate piece, the means for gripping associated with the end portion;

wherein the means for gripping comprises the handplate piece end portion having a curved formation adapted for form fitting the hand of the patient; and, further comprising a means for repositionally connecting the handplate piece to the forearm trough piece; wherein the means for repositionally connecting comprises the forearm trough having a rectangular receptacle fixed on the lower surface thereof, the handplate piece having a lower surface and a rod extension on the lower surface, the rod repositionally insertable and frictionally held within said receptacle.

23. The specialized wheelchair according to claim 21, the upper extremity support system comprising:

a forearm subassembly with a forearm trough piece for supporting the upper extremity of a patient, the forearm subassembly repositionable on, and removably associated with, an arm rail of the wheelchair;

a handplate subassembly with a handplate piece for supporting a hand, the handplate subassembly repositionable on, and removably connected to, the forearm subassembly;

means for vertical adjustment for adjusting the handplate and forearm subassemblies for raising, lowering and leveling the patient's upper extremity, said means comprising an adjustable mounting rod with a central axis and a transverse axis, the mounting rod further having a pair of threaded holes, the wheelchair arm rail having a pair of threaded holes corresponding to the threaded holes of the mounting rod, and a pair of threaded bolts mounted in the wheelchair arm rail and in the adjustable mounting rod, for vertical adjustment and leveling of the rod on the arm rail; the support assembly further comprising a means for pivotal rotation of the handplate and forearm subassemblies radially about the central axis of the adjustable mounting rod;

wherein the means for pivotal rotation of the handplate and forearm subassemblies comprises a first link having a female mounting adapter with an upper mounting hole and a lower mounting hole therethrough, the lower hole grooved essentially orthogonal to the upper hole, and each mounting hole having an adjacent capscrew to form an upper and a lower split clamp; the mounting rod inserted in the upper split clamp to mount the first link on the adjustable mounting rod, and positioned between the bolts, for pivotal rotation of said first link radially about the central axis of the adjustable mounting rod to a desired position and fixed in the desired position by tightening the capscrew of the upper split clamp;

further comprising an elbow stop subassembly with an elbow stop piece, the elbow stop subassembly repositionable on, and removably connected to, the forearm subassembly;

a means for alignment and adjustment of said elbow stop piece in relation to the forearm piece;

a second link repositionally attached to the first link, the second link having a means for radial rotation on the transverse axis of said adjustable mounting rod, wherein the means for radial rotation of the second link on the transverse axis of the adjustable mounting rod comprises a female slide mounting adaptor having interior and exterior sides, a rod projection mounted on the interior side for insertion in, and securement by, the lower slit the multiposition support assembly for a wheelchair further comprising a means for quick removal of the forearm, handplate and elbow stop subassemblies without disturbing an alignment and an adjustment of said subassemblies;

a means for three dimensional repositioning of said forearm, handplate and elbow stop subassemblies; wherein the means for quick removal of the forearm, handplate and elbow stop subassemblies without disturbing an alignment and adjustment of said subassemblies comprises the female slide mounting adaptor further having a pair of stop guides mounted on its exterior side;

a male mounting slide having a slit therethrough, the slit having an adjacent capscrew to form a slit clamp, the male mounting slide insertable in, and slidably removable from, the female slide mounting adaptor;

wherein the means for three dimensional repositioning of said forearm, handplate and elbow stop subassemblies comprises the forearm trough piece having upper and lower surfaces, with a forearm ball clamp secured on its lower surface, the forearm ball clamp having cap screws for tightening the clamp;

a forearm support ball rod swivel formed as an L-shaped rod with leg and foot portions in a plane, the foot portion having a further projection extending obliquely up from the plane of the L-shaped rod, and the projection culminating with a support ball integrally formed on the end of the rod; the leg portion insertable in and secured by the slit clamp of male mounting slide to provide a further discretionary positioning on a vertical elevation of the forearm trough and tightening the cap screw of the male mounting slide to secure the rod in the slit clamp at a desired elevation; and the ball at the end of said oblique projection insertable in and secured by the forearm ball clamp by tightening the cap screws of the forearm ball clamp after the forearm trough is brought to a desired position by a three-dimensional rotation of the trough on said support ball;

wherein the means for alignment and adjustment of said elbow stop piece comprises a female forearm slide connector permanently attached to said lower surface of the forearm trough piece;

a male slide connector formed as two open cylinder halves with a cylinder cavity formed therein, and cap screws to tighten the cylinder around the cavity to form a ball clamp; and the cylinder further having a projector connection fixed to one of the cylinder halves, the projector connection insertable into the female forearm slide connector;

the elbow stop piece having inner and outer surfaces with a ball clamp fixed to its outer surface;

an extendable ball rod swivel having a middle tube portion and two extension end portions, the end portions being L-shaped with a leg and a foot component, each end portion having its leg component inserted in the middle tube and the foot component of each end portion extending essentially orthogonally from the middle tube portion, and each end portion having a support ball integrally formed on the end of its foot component; the middle tube having a clamp for securing the end portions within the middle tube at a desired extension of the ball rod swivel; the ball of one end portion insertable in the ball clamp of the elbow stop piece, and the ball of the other end portion insertable in the cylinder cavity of the male slide connector; said means for alignment and adjustment enabling vertical adjustment and rotational alignment of the elbow stop piece on the forearm trough;

further comprising a wheelchair mounting clamp adapted for securing to the lower extension of a wheelchair;

an ball rod with first and second ends, the first end mounted in said clamp for securing the ball rod securely in position within the clamp; and, the second end having ball formed thereon;

further comprising a footplate subassembly with a footplate piece having top and bottom surfaces; a ball clamp with first and second halves, the first ball clamp half fixed to the bottom footplate piece surface and the second half adapted to coact with, and be secured to, the first half by a pair of cap screws following insertion and positioning of the ball on the second ball rod end;

further comprising an L-shaped connector, with leg and foot portions, the leg portion also fixed to the bottom footplate piece surface, and the foot of the L-shape forming a vertical rise for securing on said foot a heel stop yoke and one-half of a heel stop ball clamp;

an opposed one-half of the heel stop ball clamp is adapted, in conjunction with a pair of cap screws, to secure within the heel stop ball clamp thus formed, a calf-plate support bar;

said support bar having a sliding and radially pivotal adjuster clamp, a ball end and tightening cap screw for clamping action when the clamp is directed in a desired position;

a contoured calfplate with interior and exterior sides, with a one-half ball clamp permanently attached on the exterior side, which together with a free second ball clamp half and a pair of cap screws is adapted to secure said ball end and, thereby secure the calf-plate support bar, the calf-plate and said footplate piece and heel stop yoke in the desired position;

wherein the contoured calf plate further comprises a female receptacle fixed to the exterior side thereof;

a knee-plate ab-aductor with interior and exterior sides and a slide fixed on its exterior side for insertion in said female receptacle on the calf plate;

wherein said forearm trough piece, handplate piece, elbow stop piece, footplate, heel stop yoke, contoured calf plate and knee plate are constructed of an elastic polymer material;

wherein the handplate piece further comprises an end portion;

means for gripping the handplate piece, the means for gripping associated with the end portion;

wherein the means for gripping comprises a handle bar fixed to and rising upward from the handplate piece for tactile grasp by the patient;

further comprising a means for repositionally connecting the handplate piece to the forearm trough piece;

wherein the means for repositionally connecting comprises the forearm trough having a rectangular receptacle fixed on the lower surface thereof, the handplate piece having a lower surface and a rod extension on the lower surface, the rod repositionally insertable and frictionally held within said receptacle.

* * * * *